United States Patent
Cheng et al.

(10) Patent No.: US 8,270,327 B2
(45) Date of Patent: Sep. 18, 2012

(54) METHODS AND SYSTEMS FOR WIMAX BROADCASTING MESSAGES PROCESSING

(75) Inventors: Steven Cheng, San Diego, CA (US); Patrick Lim, San Diego, CA (US); Fangqi Hu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 190 days.

(21) Appl. No.: 12/358,813

(22) Filed: Jan. 23, 2009

(65) Prior Publication Data

US 2010/0188965 A1 Jul. 29, 2010

(51) Int. Cl.
*G08C 17/00* (2006.01)
*H04W 4/00* (2009.01)

(52) U.S. Cl. .................. 370/311; 370/329; 455/509

(58) Field of Classification Search .............. 370/310, 370/311, 328–330, 338, 341, 343, 345; 455/509, 455/522
See application file for complete search history.

(56) References Cited

U.S. PATENT DOCUMENTS

| 2008/0084941 | A1 | 4/2008 | Mohanty et al. |
| 2008/0198830 | A1 | 8/2008 | Mohanty et al. |
| 2008/0259879 | A1* | 10/2008 | Connors et al. .............. 370/336 |
| 2009/0067377 | A1* | 3/2009 | Talukdar et al. ............. 370/329 |
| 2009/0086670 | A1* | 4/2009 | Hart et al. .................... 370/329 |
| 2009/0092085 | A1* | 4/2009 | Ramesh et al. ............... 370/329 |
| 2009/0103561 | A1* | 4/2009 | Qi et al. ........................ 370/468 |
| 2009/0316806 | A1* | 12/2009 | Cheng et al. .................. 375/260 |

FOREIGN PATENT DOCUMENTS

WO  WO09028910  3/2009

OTHER PUBLICATIONS

International Search Report & Written Opinion—PCT/US2010/021875, International Search Authority—European Patent Office—Dec. 5, 2010.
"Part 16: Air Interface for Broadband Wireless Access Systems" Draft Standard for Local and Metropolitan Area Networks, IEEE, US, No. P802.16Rev2/D4, Apr. 1, 2008, pp. 630-634, XP002579581 paragraph [8.3.5.1] figures 210,211.

* cited by examiner

*Primary Examiner* — Kerri Rose
(74) *Attorney, Agent, or Firm* — Tyler Overall

(57) ABSTRACT

Certain embodiments of the present disclosure propose a technique that may be utilized to accelerate the processing of MAC management messages by an MS, allowing the MS to return to a lower power state sooner, thereby conserving power. An indication of whether or not data bursts in a downlink (DL) sub-frame contain MAC management messages may allow the MS to avoid needlessly processing of data bursts and return to a low power state sooner.

32 Claims, 13 Drawing Sheets

| Information Element | Size |
|---|---|
| Management Message Type = 2 | 8 bits |
| Frame Duration Code | 8 bits |
| Frame Number | 24 bits |
| DCD Count | 8 bits |
| Base Station ID | 48 bits |
| No. OFDMA Symbols in DL Subframe | 8 bits |
| DL-MAP_IE 1 | Variable |
| DL-MAP_IE 2 | Variable |
| ⋮ | |
| DL-MAP_IE n | Variable |
| Padding | 0 or 4 bits |

FIG. 5B

METHODS AND SYSTEMS FOR WIMAX BROADCASTING MESSAGES PROCESSING

TECHNICAL FIELD

Certain embodiments of the present disclosure generally relate to wireless communication and, more particularly, to downlink (DL)-MAP processing of orthogonal frequency-division multiplexing (OFDM) or orthogonal frequency division multiple access (OFDMA) frames.

SUMMARY

Certain embodiments provide a method of wireless communications via orthogonal frequency-division multiplexing (OFDM) or orthogonal frequency division multiple access (OFDMA). The method generally includes generating a frame having a downlink (DL)-MAP and two or more data bursts, configuring at least one information element (IE) within the DL-MAP to indicate the presence of one or more MAC management messages in the two or more data bursts, and transmitting a signal based on the frame.

Certain embodiments provide a method of wireless communications via orthogonal frequency-division multiplexing (OFDM) or orthogonal frequency division multiple access (OFDMA). The method generally includes generating a frame having an uplink (UL)-MAP and two or more data bursts, configuring a data burst layout of the frame such that a set of one or more MAC management messages to be transmitted are located immediately subsequent to a data burst containing the uplink (UL)-MAP, and transmitting a signal based on the previously generated frame.

Certain embodiments provide a method of wireless communications via orthogonal frequency-division multiplexing (OFDM) or orthogonal frequency division multiple access (OFDMA). The method generally includes receiving a signal based on an OFDM or OFDMA frame having a downlink (DL)-MAP and two or more data bursts, parsing the OFDM or OFDMA frame, determining if there is one or more MAC management messages present in at least one of the two or more data bursts, and entering a low power state before decoding the entire OFDM or OFDMA frame, if the one or more MAC management messages is not present.

Certain embodiments provide an apparatus for wireless communications via orthogonal frequency-division multiplexing (OFDM) or orthogonal frequency division multiple access (OFDMA). The method generally includes logic for generating a frame having a downlink (DL)-MAP and two or more data bursts, logic for configuring at least one information element (IE) within the DL-MAP to indicate the presence of one or more MAC management messages in the two or more data bursts, and logic for transmitting a signal based on the frame.

Certain embodiments provide an apparatus for wireless communications via orthogonal frequency-division multiplexing (OFDM) or orthogonal frequency division multiple access (OFDMA). The apparatus generally includes logic for generating a frame having an uplink (UL)-MAP and two or more data bursts, logic for configuring a data burst layout of the frame such that a set of one or more MAC management messages to be transmitted are located immediately subsequent to a data burst containing the uplink (UL)-MAP, and logic for transmitting a signal based on the previously generated frame.

Certain embodiments provide an apparatus for wireless communications via orthogonal frequency-division multiplexing (OFDM) or orthogonal frequency division multiple access (OFDMA). The apparatus generally includes logic for receiving a signal based on an OFDM or OFDMA frame having a downlink (DL)-MAP and two or more data bursts, logic for parsing the OFDM or OFDMA frame, logic for determining if there is one or more MAC management messages present in at least one of the two or more data bursts, and logic for entering a low power state before decoding the entire OFDM or OFDMA frame, if the one or more MAC management messages is not present.

Certain embodiments provide an apparatus for wireless communications via orthogonal frequency-division multiplexing (OFDM) or orthogonal frequency division multiple access (OFDMA). The apparatus generally includes means for generating a frame having a downlink (DL)-MAP and two or more data bursts, means for configuring at least one information element (IE) within the DL-MAP to indicate the presence of one or more MAC management messages in the two or more data bursts, and means for transmitting a signal based on the frame.

Certain embodiments provide an apparatus for wireless communications via orthogonal frequency-division multiplexing (OFDM) or orthogonal frequency division multiple access (OFDMA). The apparatus generally includes means for generating a frame having an uplink (UL)-MAP and two or more data bursts, means for configuring a data burst layout of the frame such that a set of one or more MAC management messages to be transmitted are located immediately subsequent to a data burst containing the uplink (UL)-MAP, and means for transmitting a signal based on the previously generated frame.

Certain embodiments provide an apparatus for wireless communications via orthogonal frequency-division multiplexing (OFDM) or orthogonal frequency division multiple access (OFDMA). The apparatus generally includes means for receiving a signal based on an OFDM or OFDMA frame having a downlink (DL)-MAP and two or more data bursts, means for parsing the OFDM or OFDMA frame, means for determining if there is one or more MAC management messages present in at least one of the two or more data bursts, and means for entering a low power state before decoding the entire OFDM or OFDMA frame, if the one or more MAC management messages is not present.

Certain embodiments provide a computer-program product for wireless communications via orthogonal frequency-division multiplexing (OFDM) or orthogonal frequency division multiple access (OFDMA), comprising a computer readable medium having instructions stored thereon, the instructions being executable by one or more processors. The instructions generally include instructions for generating a frame having a downlink (DL)-MAP and two or more data bursts, instructions for configuring at least one information element (IE) within the DL-MAP to indicate the presence of one or more MAC management messages in the two or more data bursts, and instructions for transmitting a signal based on the frame.

Certain embodiments provide a computer-program product for wireless communications via orthogonal frequency-division multiplexing (OFDM) or orthogonal frequency division multiple access (OFDMA), comprising a computer readable medium having instructions stored thereon, the instructions being executable by one or more processors. The instructions generally include instructions for generating a frame having an uplink (UL)-MAP and two or more data bursts, instructions for configuring a data burst layout of the frame such that a set of one or more MAC management messages to be transmitted are located immediately subsequent to a data burst containing the uplink (UL)-MAP, and instructions for transmitting a signal based on the previously generated frame.

Certain embodiments provide a computer-program product for wireless communications via orthogonal frequency-division multiplexing (OFDM) or orthogonal frequency division multiple access (OFDMA), comprising a computer readable medium having instructions stored thereon, the instructions being executable by one or more processors. The instructions generally include instructions for receiving a signal based on an OFDM or OFDMA frame having a downlink (DL)-MAP and two or more data bursts, instructions for parsing the OFDM or OFDMA frame, instructions for determining if there is one or more MAC management messages present in at least one of the two or more data bursts, and instructions for entering a low power state before decoding the entire OFDM or OFDMA frame, if the one or more MAC management messages is not present.

In certain embodiments, for example those presented in paragraphs above, the frame, or OFDM or OFDMA frame, can have a format in accordance with one or more standards of the Institute of Electrical and Electronics Engineers (IEEE) 802.16 family of standards.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 5A and 5B illustrate the format of and the bit size of entries in a downlink map (DL-MAP) message with a generic DL-MAP information element (IE).

DETAILED DESCRIPTION

Figure 1:
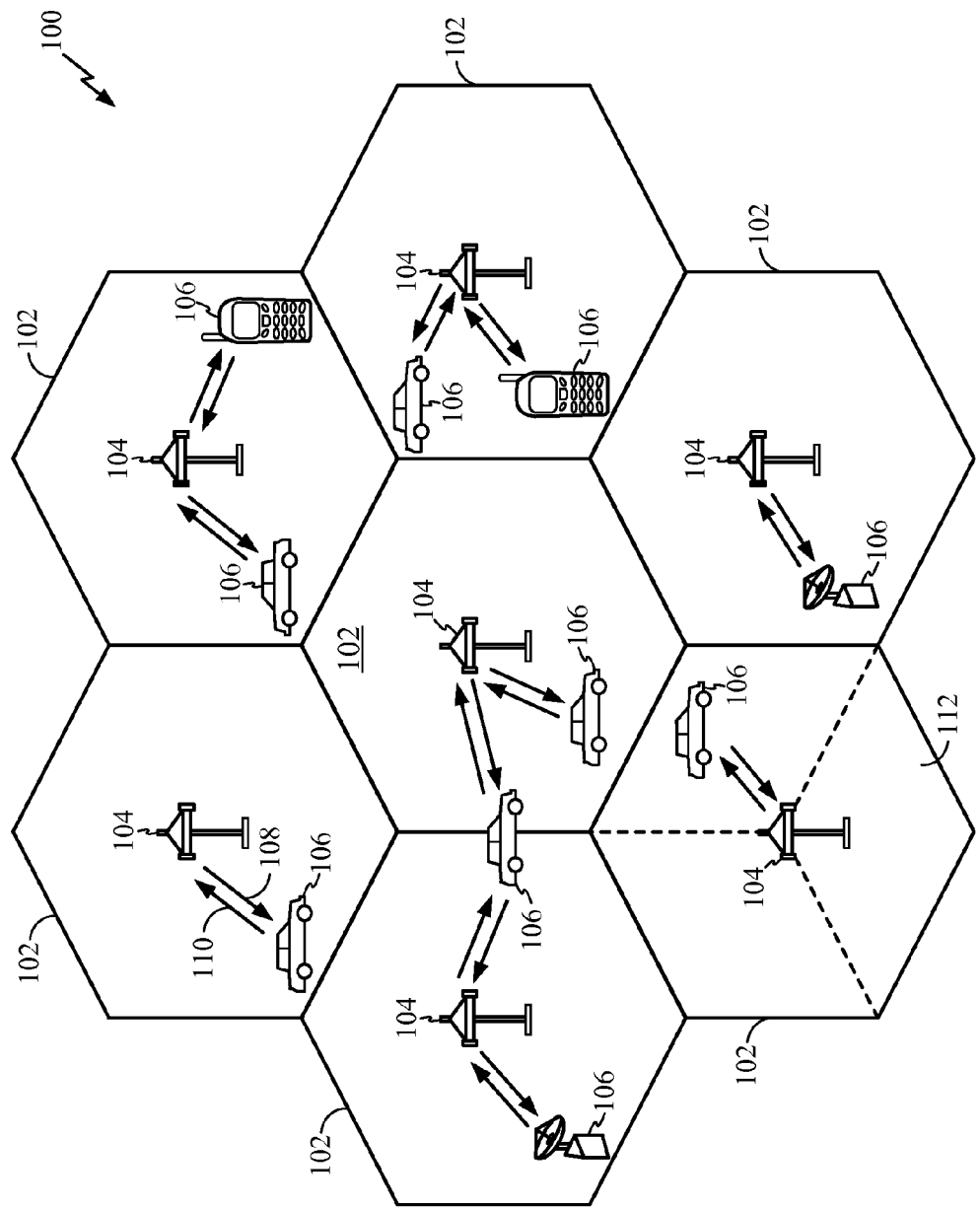
FIG. 1 illustrates an example wireless communication system, in accordance with certain embodiments of the present disclosure.

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station emits and receives radio frequency (RF) signals that convey data to and from the mobile stations. Such an RF signal from a base station includes an overhead load, in addition to the data load (voice and other data), for various communication management functions. Each mobile station processes the information in the overhead load of each received signal prior to processing the data.

Under the current versions of the IEEE 802.16x standard for the OFDMA systems, every downlink sub-frame from a base station includes a preamble, a frame control header (FCH) following the preamble, and a downlink map (DL-MAP) following the FCH as part of the overhead load. The preamble includes information for searching a cell and a cell sector within a cell and for synchronizing a mobile station in both time and frequency with the received downlink signal. The FCH portion of the downlink sub-frame includes 24 bits with information on the downlink transmission format (e.g., the DL-MAP) and control information for the downlink data reception (e.g., allocation of the subcarriers in the current downlink frame). The DL-MAP specifies downlink data region allocation and burst profile information so that the DL data bursts in the OFDM/OFDMA frame may be correctly decoded. The first DL data burst is typically an uplink map (UL-MAP) containing similar allocation and burst profile information for uplink transmissions on a per-frame basis.

Subsequent DL data bursts in the DL sub-frame may contain user traffic data streams and broadcast messages such as MAC management messages. The MAC management messages may include UCD, DCD, CLK-CMP, FPC, MOB_TRF-IND, MOB_NBR-ADV, and MOB_PAG-ADV messages.

However, under current versions of the IEEE 802.16 standard, there are no requirements governing the placement of broadcast paging messages within the DL data bursts of a DL sub-frame. For example, a DL sub-frame may contain a DCD message in DL data burst #2, user traffic data streams in DL data bursts #3 and #4, and a MOB_PAG-ADV message in DL data burst #5. Thus, an MS may have to inefficiently process all data bursts to find a MAC management message.

Certain embodiments of the present disclosure propose a method and apparatus for accelerating the processing of MAC management messages by an MS. For example, certain embodiments provide a BS capable of generating an OFDM or OFDMA frame with a downlink (DL)-MAP and two or more DL data bursts, the OFDM or OFDMA frames configured such that a set of MAC management messages to be transmitted are easily identifiable.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
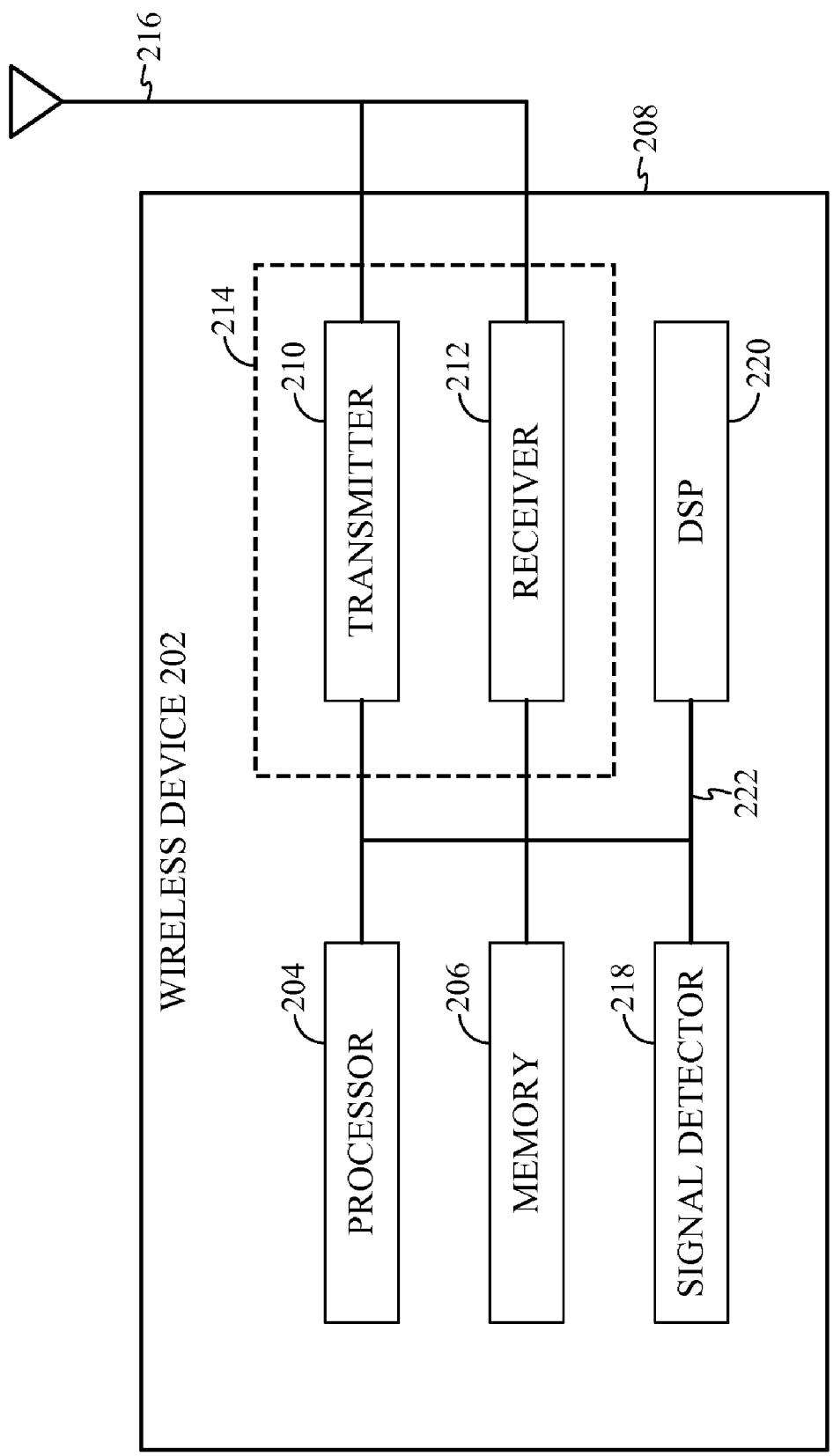
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
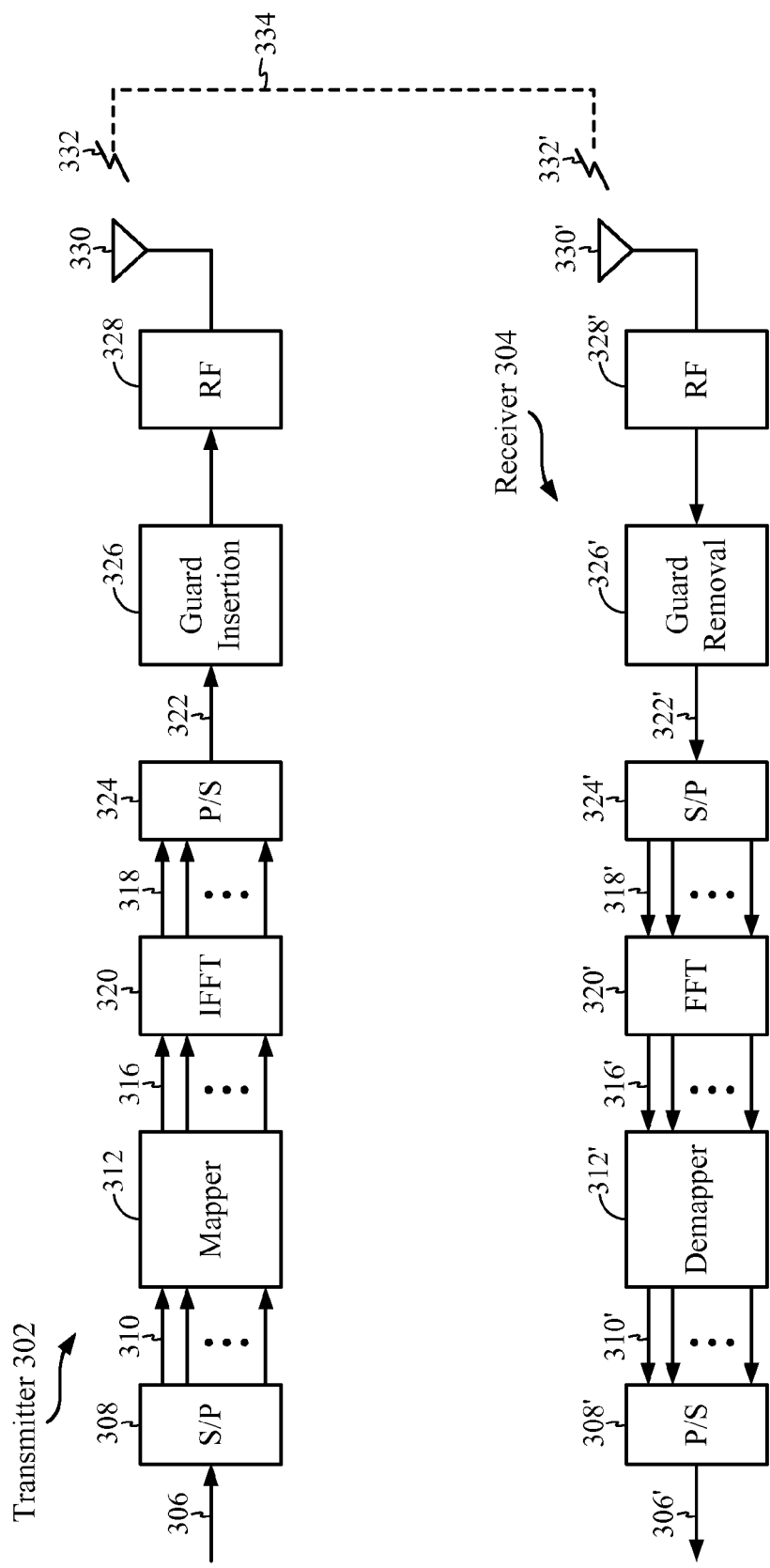
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary OFDM/OFDMA Frame

Figure 4:
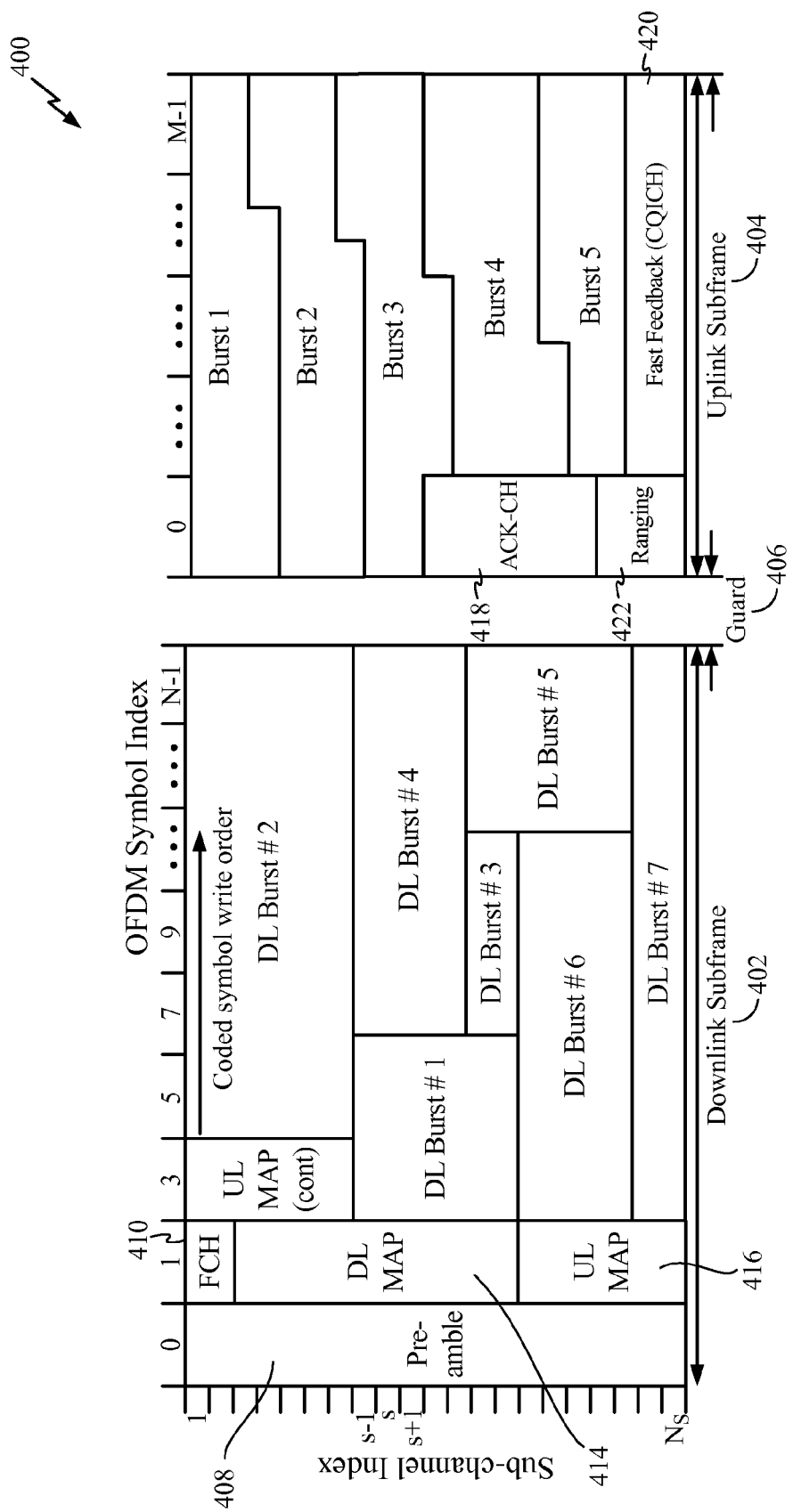
FIG. 4 illustrates an example OFDM/OFDMA frame for Time Division Duplex (TDD).

Referring now to FIG. 4, an OFDM/OFDMA frame 400 for a Time Division Duplex (TDD) implementation is depicted as a typical, but not limiting, example. Other implementations of an OFDM/OFDMA frame, such as Full and Half-Duplex Frequency Division Duplex (FDD) may be used, in which case the frame may have a similar structure, except that both downlink (DL) and uplink (UL) messages may be transmitted simultaneously over different carriers. In the TDD implementation, each frame may be divided into a DL sub-frame 402 and a UL sub-frame 404, which may be separated by a small guard interval 406—or, more specifically, by Transmit/Receive and Receive/Transmit Transition Gaps (TTG and RTG, respectively)—in an effort to prevent DL and UL transmission collisions. The DL-to-UL sub-frame ratio may be varied from 3:1 to 1:1 to support different traffic profiles.

Within the OFDM/OFDMA frame 400, various control information may be included. For example, the first OFDM/OFDMA symbol of the frame 400 may be a preamble 408, which may contain several pilot signals (pilots) used for synchronization. Fixed pilot sequences inside the preamble 408 may allow the receiver 304 to estimate frequency and phase errors and to synchronize to the transmitter 302. Moreover, fixed pilot sequences in the preamble 408 may be utilized to estimate and equalize wireless channels. The preamble 408 may contain BPSK-modulated carriers and is typically one OFDM symbol long. The carriers of the preamble 408 may be power boosted and are typically a few decibels (dB) (e.g., 9 dB) higher than the power level in the frequency domain of data portions in the WiMAX signal. The number of preamble carriers used may indicate which of the three segments of the zone are used. For example, carriers 0, 3, 6, ... may indicate that segment 0 is to be used, carriers 1, 4, 7, ... may indicate that segment 1 is to be used, and carriers 2, 5, 8, ... may indicate that segment 2 is to be used.

A Frame Control Header (FCH) 410 may follow the preamble 408. The FCH 410 may provide frame configuration information, such as the usable sub-channels, the modulation and coding scheme, and the MAP message length for the current OFDM/OFDMA frame.

Following the FCH 410, a DL-MAP 414 and a UL-MAP 416 may specify data burst allocation and other control information for the DL and UL sub-frames 402, 404. In the case of OFDMA, multiple users may be allocated data regions within the frame, and these allocations may be specified in the DL and UL-MAP messages 414, 416. The MAP messages may include the burst profile for each user, which defines the modulation and coding scheme used in a particular link. Since MAP messages contain critical information that needs to reach all users, the DL and UL-MAP messages 414, 416 may often be sent over a very reliable link, such as BPSK or QPSK with rate ½ coding and repetition coding. The DL sub-frame 402 of the OFDM/OFDMA frame may include DL bursts of various bit lengths containing the downlink data being communicated. Thus, the DL-MAP 414 may describe the location of the bursts contained in the downlink zones and the number of downlink bursts, as well as their offsets and lengths in both the time (i.e., symbol) and the frequency (i.e., sub-channel) directions.

Likewise, the UL sub-frame 404 may include UL bursts of various bit lengths composed of the uplink data being communicated. Therefore, the UL-MAP 416, transmitted as the first burst in the downlink sub-frame 402, may contain information about the location of the UL burst for different users. The UL sub-frame 404 may include additional control information as illustrated in FIG. 4A. The UL sub-frame 404 may include a UL ACK 418 allocated for the mobile station (MS) to feed back a DL hybrid automatic repeat request acknowledge (HARQ ACK) and/or a UL CQICH 420 allocated for the MS to feed back channel quality information on the Channel Quality Indicator channel (CQICH). Furthermore, the UL sub-frame 404 may comprise a UL Ranging sub-channel 422. The UL Ranging sub-channel 422 may be allocated for the MS to perform closed-loop time, frequency, and power adjustment, as well as bandwidth requests. Altogether, the preamble 408, the FCH 410, the DL-MAP 414, and the UL-MAP 416 may carry information that enables the receiver 304 to correctly demodulate the received signal.

For OFDMA, different "modes" can be used for transmission in DL and UL. An area in the time domain where a certain mode is used is generally referred to as a zone. One type of zone is called DL-PUSC (downlink partial usage of subchannels) and may not use all the subchannels available to it (i.e., a DL-PUSC zone may only use particular groups of subchannels). There may be a total of six subchannel groups, which can be assigned to up to three segments. Thus, a segment can contain one to six subchannel groups (e.g., segment 0 contains the first two subchannel groups, segment 1 contains the next two, and segment 2 contains the last two subchannel groups). Another type of zone is called DL-FUSC (downlink full usage of subchannels). Unlike DL-PUSC, DL-FUSC does not use any segments, but can distribute all bursts over the complete frequency range.

Exemplary DL-MAP and DL-MAP IEs

Figure 5A:
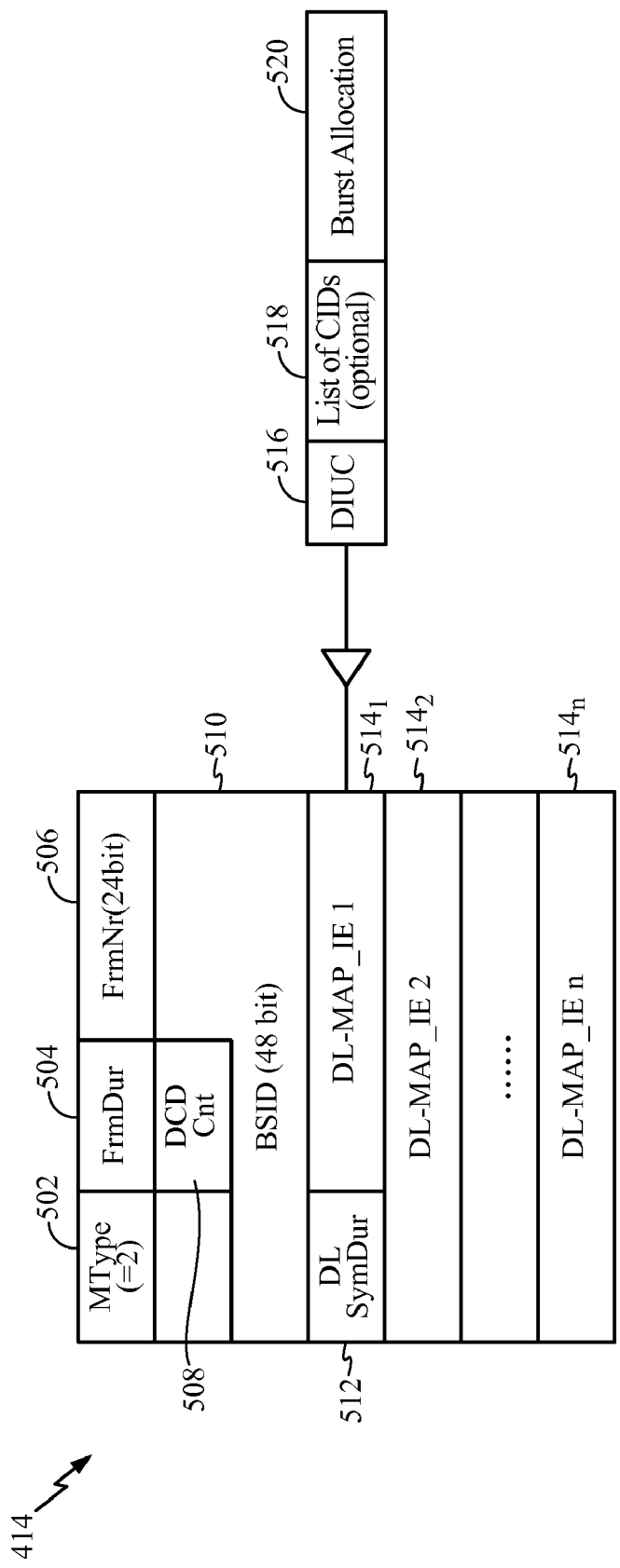

The DL-MAP 414 of FIG. 4A, according to certain embodiments, is illustrated in more detail in FIG. 5A with FIG. 5B illustrating the length in bits of each component of the DL-MAP 414.

The DL-MAP 414 may begin with a Management Message Type 502 having a length of 8 bits, which has a value of 2 (00000010b) to indicate the control message is a DL-MAP. In the illustrated example, the Management Message Type 502 may be followed by a frame duration code 504, which is 8 bits long, and a frame number 506, which is 24 bits long. The frame number 506 may be followed by a Downlink Channel Descriptor (DCD) count 508 having a length of 8 bits and matching the DCD configuration change count value. The DCD message refers to physical and Media Access Control (MAC) layer-related parameters to be applied to the downlink channel configuration of the sector. The DCD count 508 may be followed by a base station identifier (BSID) 510, having a length of 6 bytes (48 bits). The BSID 510 may uniquely identify the base station in the network and may be followed by a DL symbol duration 512 indicating a number of OFDMA symbols in the DL sub-frame 402 and having a length of 8 bits.

A number (n) of DL-MAP information elements (IEs) 514 having variable lengths may follow the DL symbol duration 512. A generic DL-MAP IE 514 may comprise a Downlink Interval Usage Code (DIUC) 516, a list of connection IDs 518, and the DL burst allocation 520 (e.g., sub-channel offset, symbol offset, sub-channel number, and symbol number) to define a downlink transmission. A DIUC 516 between 0 and 12 inclusive may indicate that the DL-MAP IE provides a DL burst profile (i.e., the modulation and coding scheme used in the burst), while a DIUC 516 of 14 or 15 may indicate that the DL-MAP IE is a control information element. A DIUC 516 of 13 may indicate that the DL-MAP IE is used for safety zones (i.e., gap) and peak-to-average-power ratio (PAPR) reduction. Although not shown in FIG. 5A, some embodiments of the DL-MAP 414 may include padding having a length of 4 bits in an effort to reach a byte boundary for the DL-MAP 414.

Exemplary Broadcast Messaging for Low Power State Environment

In the idle mode, an MS is in a low power state. In the low power state, the MS has no need to process most of the DL data bursts in a DL sub-frame because there is no user traffic destined for the MS. However, the MS may still need to receive MAC management messages. Additionally, under current versions of the IEEE 802.16 standard, there is no indication whether a DL sub-frame contains a MAC management message or where within the sub-frame a MAC management message may reside. Consequently, when the MS enters a listening interval, the MS may need to parse each data burst to evaluate the connection ID field and MAC address field and determine if there is a MAC management message destined for the MS. As a result, the MS may process irrelevant user traffic data streams, unnecessarily using power while in the low power state.

Accordingly, embodiments of the present disclosure propose a technique that may be utilized to accelerate the processing of MAC management messages by an MS, allowing the MS to return to a lower power state sooner, thereby conserving power.

Figure 6:
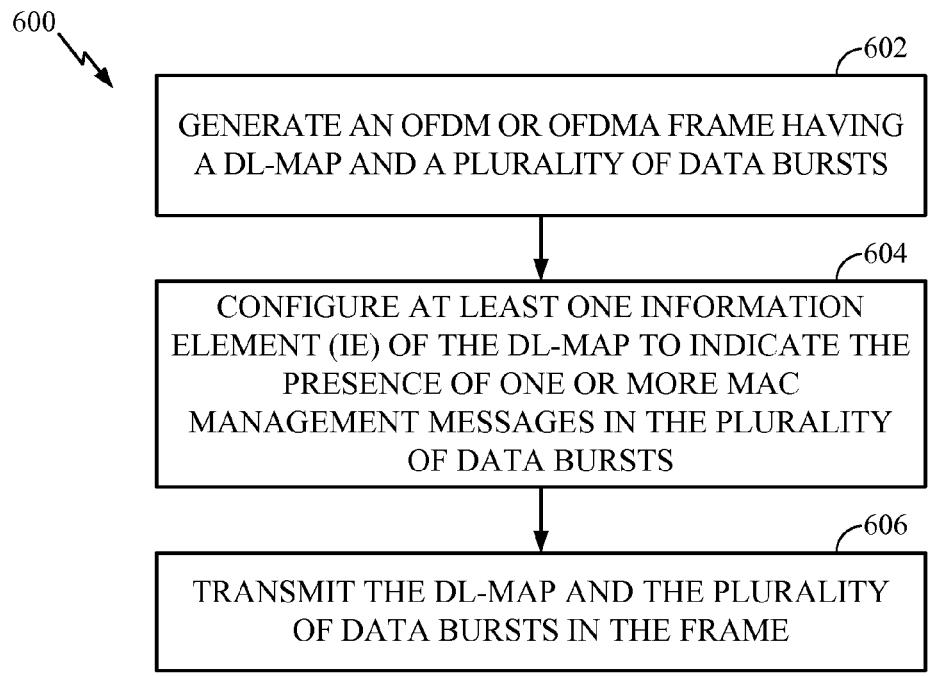
FIG. 6 illustrates example operations for transmitting a signal based on an OFDM or OFDMA frame indicating the presence of one or more MAC management messages.

FIG. 6 illustrates example operations 600 for transmitting a signal based on an OFDM or OFDMA frame indicating the presence of one or more MAC management messages, in accordance with certain embodiments of the present disclosure. The operations 600 may be performed, for example, by a BS in an effort to indicate the presence of one or more MAC management messages to an MS.

Operations 600 begin, at 602, with a BS generating an OFDM or OFDMA frame having at least a DL-MAP and a plurality of data bursts. At 604, the BS may configure at least one information element (IE) of the DL-MAP to indicate the presence of one or more MAC management messages contained in one or more of the data bursts. At 606, the BS may transmit the DL-MAP and plurality of data bursts.

As an example, in some embodiments, the BS may configure a downlink interval usage code (DIUC) of the DL-MAP to include a broadcasting messages bitmap wherein each bit of the bitmap corresponds to a unique MAC management message. If a bit value of the bitmap is set equal to '1' then the corresponding MAC management message may be present in a subsequent DL data burst. Therefore, if an MS in a low power state is only interested in the presence of one or more specific MAC management messages, the MS may reference the bitmap to determine if those specific messages are present without decoding irrelevant user traffic data streams.

This may result in power savings by reducing the processing time of an MS in a low power state. For example, if there are n symbols in a DL sub-frame and the preamble, FCH, DL-MAP, and UL-MAP require x symbols, then after processing x+1 symbols, the MS may determine if there are any MAC management messages in the DL sub-frame. If there are no MAC management messages in the DL sub-frame, the MS may avoid processing the remaining symbols, saving the processing time required for processing n−x−1 symbols.

In certain embodiments, the BS may also configure a DIUC of the DL-MAP (e.g., DIUC 15) to include a bitmap pointer set. If a bit in the broadcasting messages bitmap is set, a field in the bitmap pointer set corresponding to the bit in the broadcasting messages bitmap may indicate in which data burst the MAC management may reside. The MS may use the bitmap pointer set to directly access the data burst corresponding to a MAC management message. The MS may access the data burst from a physical layout area through the sub-channel index and an OFDMA symbol index relationship provided by the DL-MAP.

Figure 7:
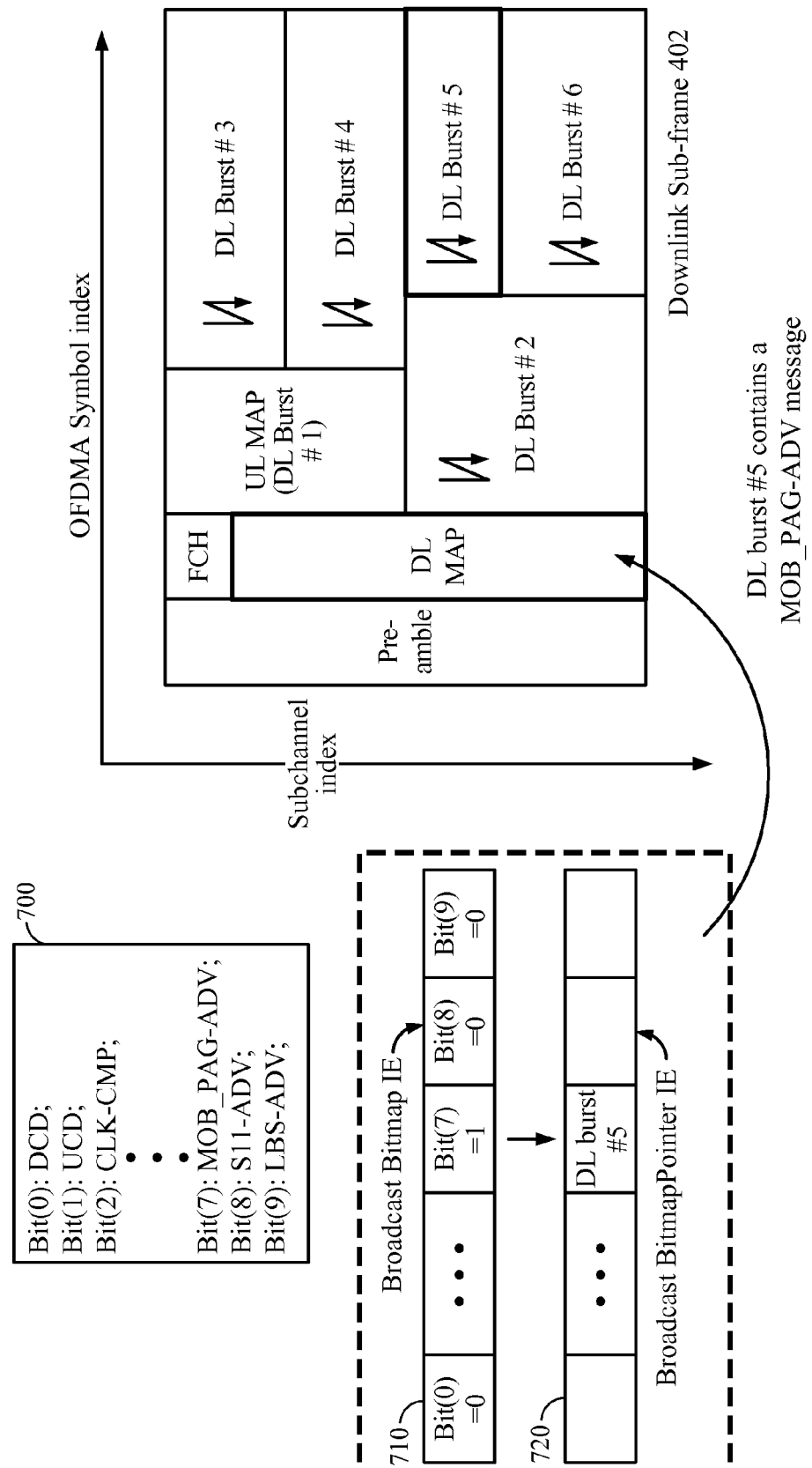
FIG. 7 illustrates two information elements (IEs) which may be included in a DL-MAP of the DL sub-frame, indicating the DL data burst(s) in which a MAC management message may reside.

For example, FIG. 7 illustrates a broadcasting messages bitmap IE 710 and a bitmap pointer IE 720, which may be included in a DL-MAP 414 of the DL sub-frame 402. Element 700 illustrates a list of bits in the broadcasting messages bitmap 710 and the corresponding MAC management messages. In the present example, the broadcasting messages bitmap IE 710 indicates that a MOB_PAG-ADV message is present in the DL sub-frame. The bitmap pointer IE 720 indicates to the MS that the DL data burst corresponding to the MOB_PAG-ADV message is DL data burst #5. Additionally, the physical location of DL data burst #5 is already provided by the DL-MAP.

Without the bitmap pointer, the MS may be required to parse all of the DL data bursts of a DL sub-frame because it cannot determine what type of information is contained in each DL data burst. Embodiments of the present disclosure may include the broadcasting messages bitmap 710 and the bitmap pointer set 720 as a new IE within the DL-MAP's DIUC 15 fields, as previously described, or within DL data burst #2, which is meant for physical layers to process.

Exemplary MAC Management Message Placement within a DL Sub-Frame

In certain embodiments, the BS may enable the acceleration of MAC management message processing by an MS without an additional indication of the presence of MAC management messages. This may be done, for example, by changing the layout of the DL data bursts and positioning any MAC management messages in data bursts immediately subsequent to the UL-MAP.

Figure 8:
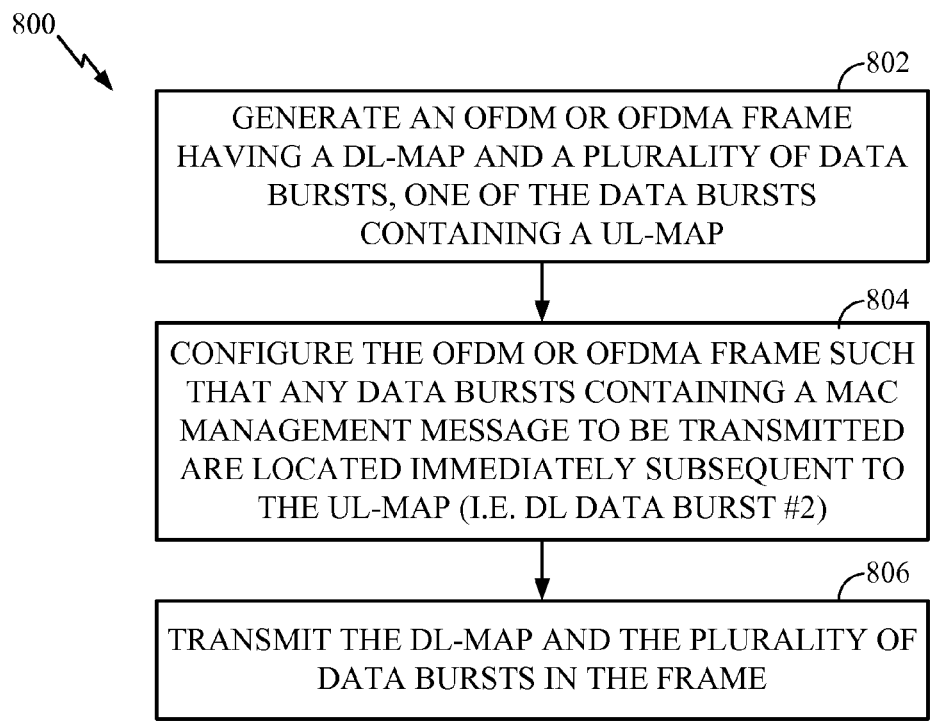
FIG. 8 illustrates example operations for transmitting a signal based on an OFDM or OFDMA frame configured such that any MAC management message within the DL sub-frame is contained in the DL data bursts immediately subsequent to the data burst containing the UL-MAP.

FIG. 8 illustrates example operations 800 for transmitting a signal based on an OFDM or OFDMA frame configured such that any MAC management messages within the DL sub-frame are contained in the DL data bursts immediately subsequent to the data burst containing the UL-MAP. The operations 800 may be performed, for example, by a BS in an effort to accelerate MAC management message processing by an MS.

Operations 800 begin, at 802, with a BS generating an OFDM or OFDMA frame having at least a DL-MAP and a plurality of data bursts, one data burst containing an uplink (UL)-MAP. At 804, the BS may configure the OFDM or OFDMA frame such that any data bursts containing MAC management messages to be transmitted are located immediately subsequent to the UL-MAP (e.g., in DL data burst #2 assuming the UL MAP is contained in DL data burst #1). At 806, the BS may transmit the DL-MAP and the plurality of data bursts in the frame.

Configuring the OFDM or OFDMA frame such that any data bursts containing MAC management messages to be transmitted are located immediately subsequent to the UL-MAP may require changes to (or additional requirements for) the layout of conventional DL data bursts, which may conflict with the deployed BS implementation under current versions of the IEEE 802.16 standard. However, the standard may be modified to require DL data bursts containing MAC management messages to be positioned immediately subsequent to the UL-MAP.

Since an MS in a low power state, such as a sleep mode or idle mode, may ignore the user data placed in DL data bursts, if the MAC management messages are placed immediately subsequent to the UL-MAP, the MS may be able to avoid processing irrelevant user traffic data streams. Rather, the MS may either return to a power saving state before all of the symbols are decoded or utilize the remainder of the frame for neighbor cell measurements.

This may result in power savings by reducing the processing time required and allow an MS in a low power state to exit a Listening interval sooner. For example, if there are n symbols in a DL sub-frame and the preamble, FCH, DL-MAP, UL-MAP, and the data bursts immediately subsequent to the UL-MAP which contain MAC management messages utilize an aggregate of k symbols, then after processing k symbols, the MS may determine if there are any MAC management messages in the DL sub-frame. If there are no MAC management messages in the DL sub-frame, the MS may avoid processing the remaining symbols, saving the processing time required for processing n-k symbols.

Figure 9A:
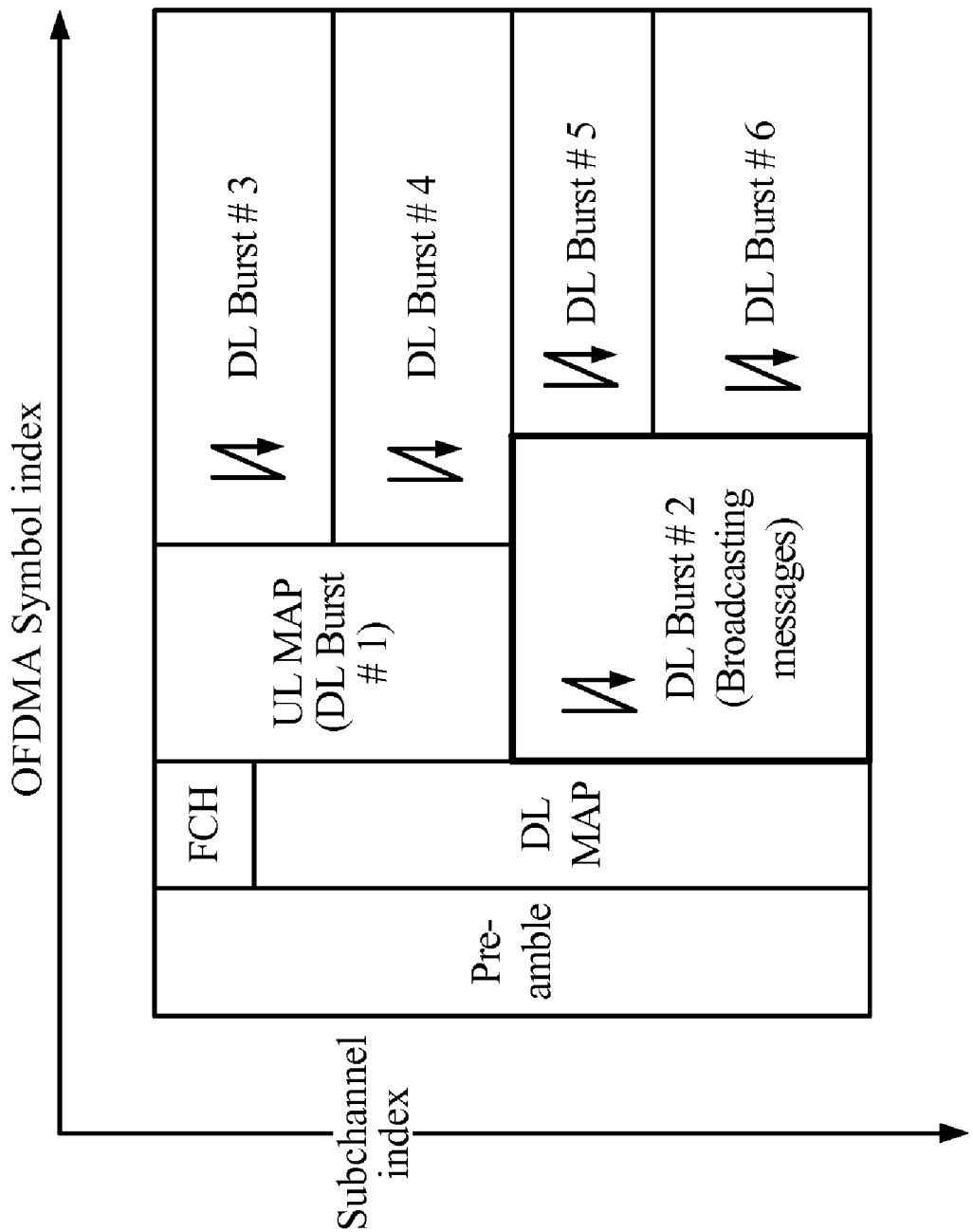
FIGS. 9A and 9B illustrate example DL sub-frames in which the MAC management messages are contained in the DL data burst immediately subsequent to the data burst containing the UL-MAP.
Figure 9B:
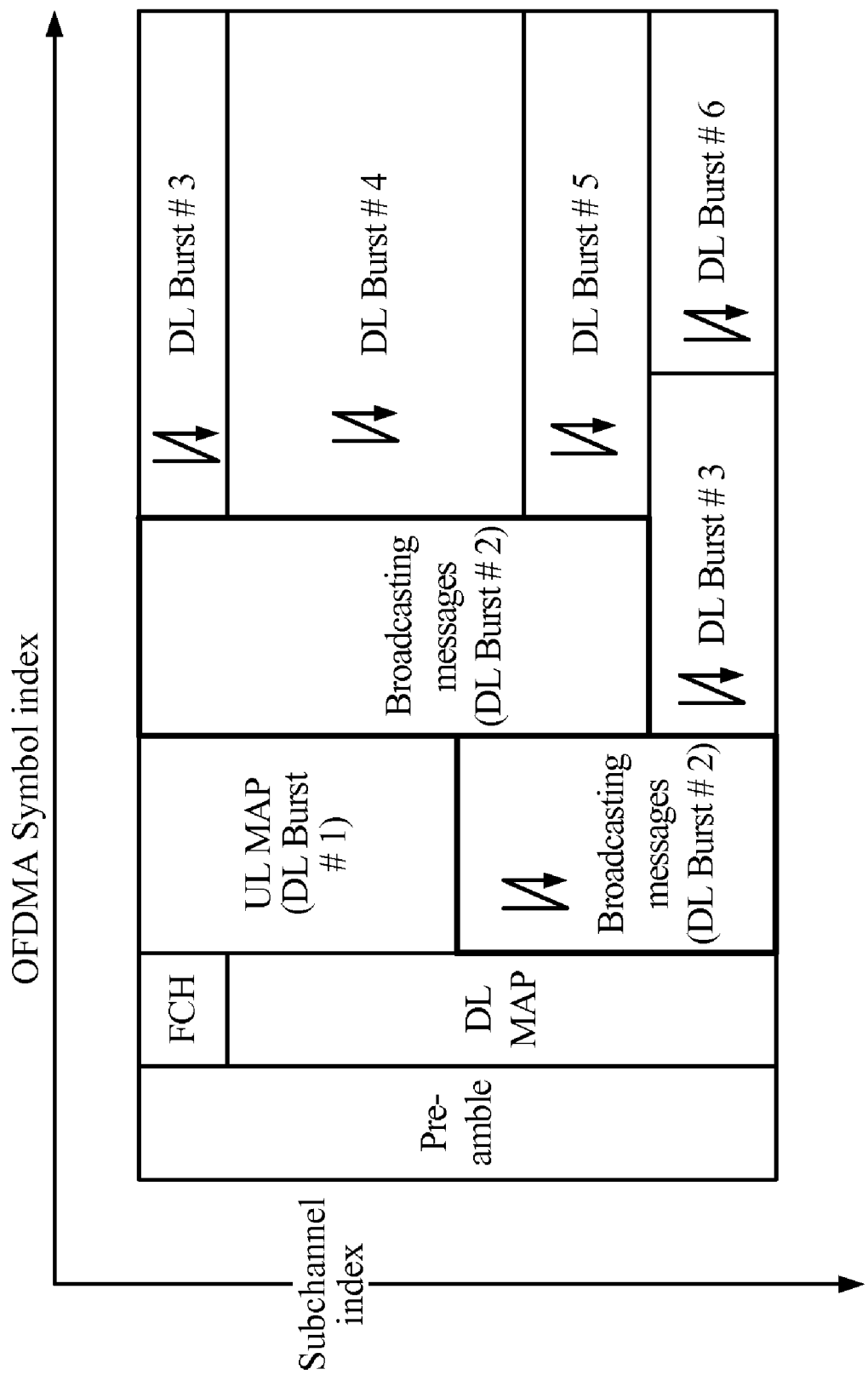

FIGS. 9A and 9B illustrate example DL sub-frames in which the MAC management messages are contained in the DL data burst immediately subsequent to the data burst containing the UL-MAP. Specifically, FIG. 9A illustrates an example DL sub-frame in which the MAC management messages are contained in a DL data burst with a constant set of sub-channels spread over a plurality of symbols, in accordance with current versions of the IEEE 802.16e standard. In contrast, FIG. 9B illustrates an example DL sub-frame in which the MAC management messages are contained in a DL data burst spread over a plurality of sub-channels reducing the number of symbols required, in accordance with the IEEE 802.16m standard. Additionally, if all of the MAC management messages can share the same symbol, varying only in sub-channel differences, then the DL sub-frame under the IEEE 802.16e standard would match the DL sub-frame under the IEEE 802.16m standard.

Exemplary DL-MAP Processing from the MS Perspective

Signals based on the constructed OFDM or OFDMA frames may be broadcast by the base station 104 and received by the user terminal 106. At the user terminal 106, the received signals may be processed such that a MAP parser, for example, may locate DL data bursts within each DL sub-frame 402 according to the DL-MAP 414 and the DL-MAP IEs 514 contained therein.

Accordingly, embodiments of the present disclosure propose a method and apparatus for accelerating the processing of signals based on the constructed OFDM or OFDMA frames, previously described, by an MS.

Figure 10:
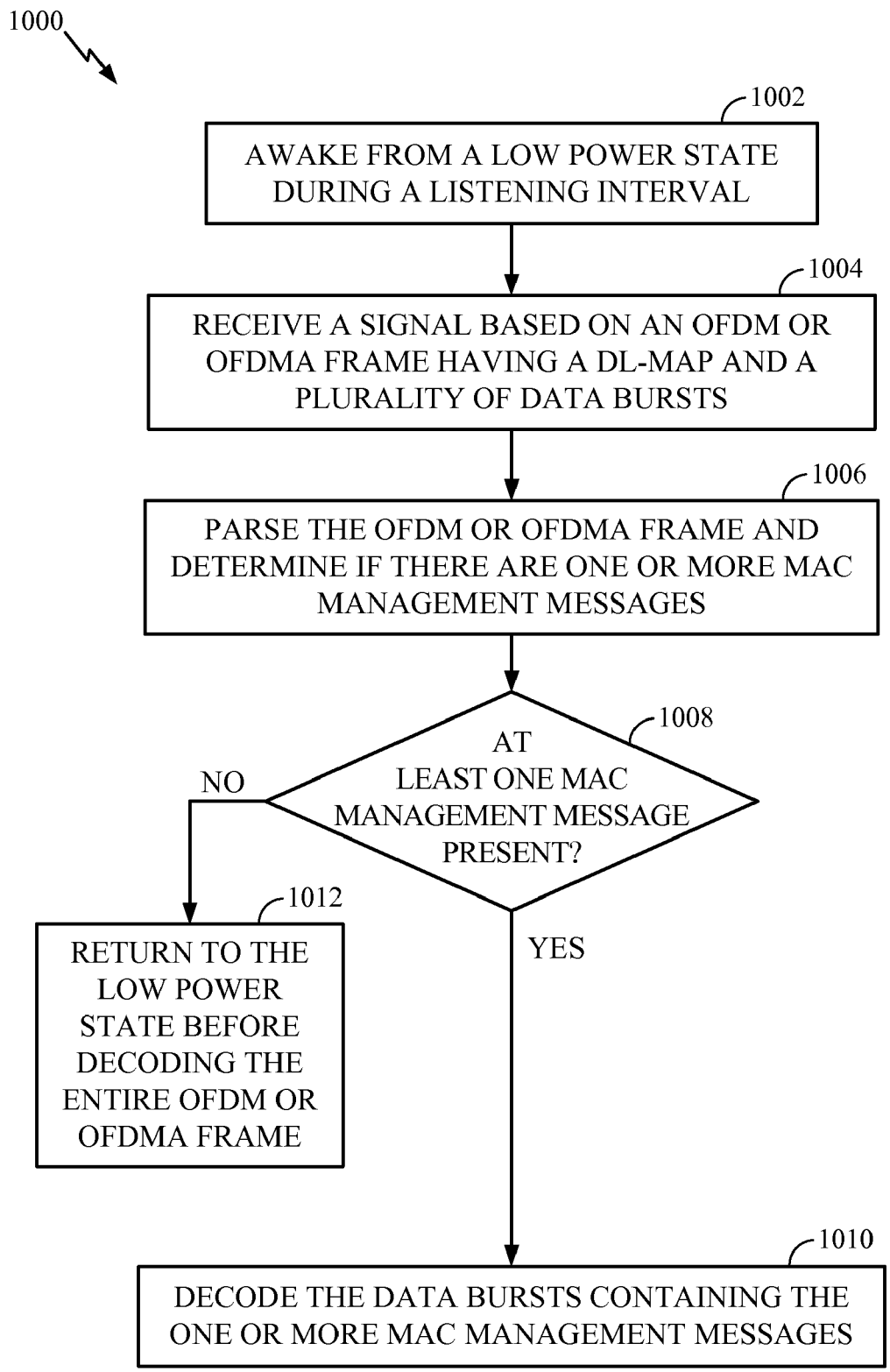
FIG. 10 illustrates example operations for receiving a signal based on an OFDM or OFDMA frame indicating the presence of one or more MAC management messages.

FIG. 10 is a flow chart of example operations 1000 for receiving a signal based on the constructed OFDM or OFDMA frame, previously described, and determining if there is one or more MAC management messages.

The operations 1000 may begin, at 1002, with a MS awakening from a low power state during a listening interval. At 1004, the MS may receive a signal based on an OFDM or OFDMA frame having a DL-MAP and a plurality of DL data bursts.

At 1006, the MS may parse the OFDM or OFDMA frame and determine if there is one or more MAC management messages. In certain embodiments, determining if there is one or more MAC management messages may include processing the DL-MAP and evaluating a broadcasting messages bitmap. However, in some embodiments, determining if there is one or more MAC management messages may include processing the preamble, FCH, DL-MAP, UL-MAP, and the data bursts immediately subsequent to the UL-MAP which contain MAC management messages.

At 1008, the MS may evaluate whether or not there is at least one MAC management message present in the DL sub-frame. If there is at least one MAC management message present, the MS, at 1010, may decode the data burst containing the one or more MAC management messages. Additionally, in certain embodiments, the MS may utilize the bitmap pointer set to locate the DL data burst within the DL sub-frame containing the one or more MAC management messages. In contrast, if there is not at least one MAC management message present, the MS, at 1012, may return to a low power state before decoding the entire OFDM or OFDMA frame.

Figure 6A:
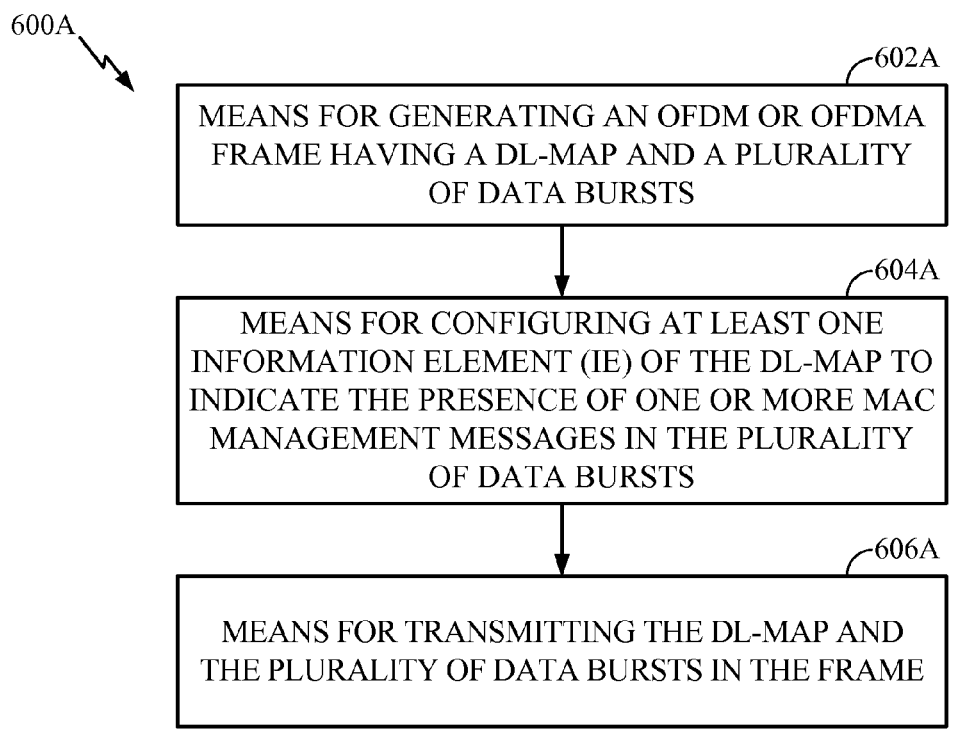
FIG. 6A is a block diagram of means corresponding to the example operations of FIG. 6.
Figure 8A:
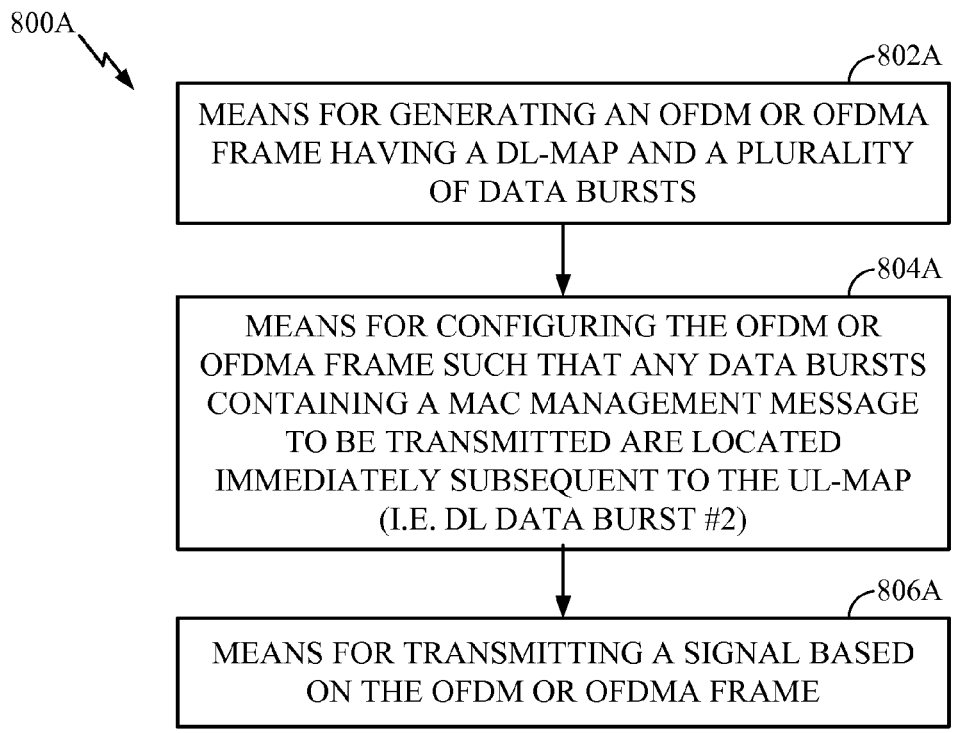
FIG. 8A is a block diagram of means corresponding to the example operations of FIG. 8.
Figure 10A:
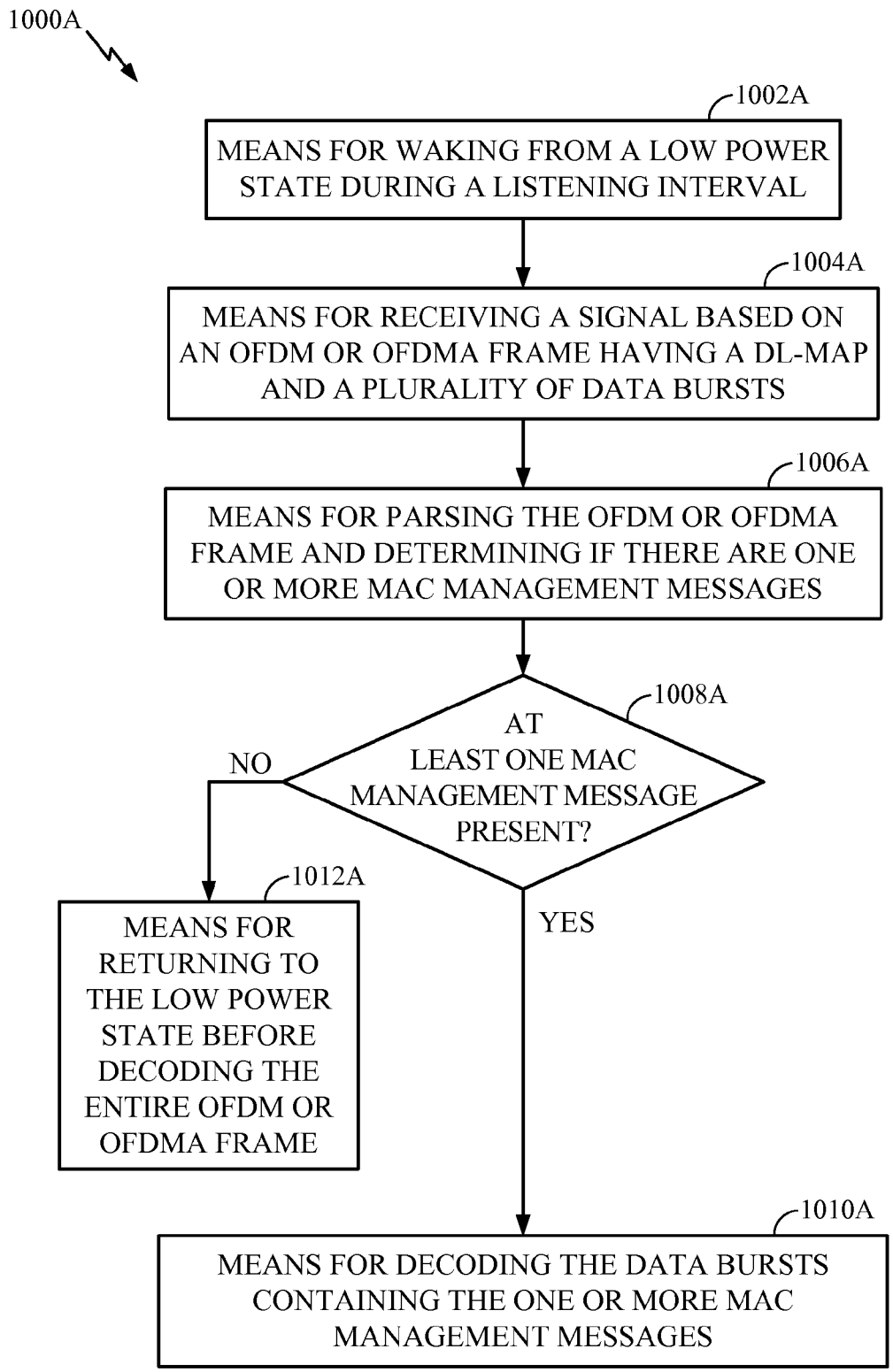
FIG. 10A is a block diagram of means corresponding to the example operations of FIG. 10.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 602-606 illustrated in FIG. 6 correspond to means-plus-function blocks 602A-606A illustrated in FIG. 6A, blocks 802-806 illustrated in FIG. 8 correspond to means-plus-function blocks 802A-806A illustrated in FIG. 8A, and blocks 1002-1012 illustrated in FIG. 10 correspond to means-plus-function blocks 1002A-1012A illustrated in FIG. 10A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications via orthogonal frequency-division multiplexing (OFDM) or orthogonal frequency division multiple access (OFDMA), comprising:
generating a frame having a downlink (DL)-MAP, comprising a broadcasting messages bitmap, and two or more data bursts;
configuring at least one information element (IE) within the DL-MAP to indicate the presence of one or more MAC management messages in the two or more data bursts; and
transmitting a signal based on the frame.

2. The method of claim 1, wherein the at least one IE within the DL-MAP is further configured to identify which of the two or more data bursts contains a MAC management message previously indicated.

3. The method of claim 1, wherein the at least one IE within the DL-MAP is located in downlink interval usage code (DIUC) of the DL-MAP.

4. The method of claim 3, wherein the at least one IE within the DL-MAP is located in DIUC 15.

5. A method of wireless communications via orthogonal frequency-division multiplexing (OFDM) or orthogonal frequency division multiple access (OFDMA), comprising:

generating a frame having an uplink (UL)-MAP, comprising a broadcasting messages bitmap, and two or more data bursts;
configuring a data burst layout of the frame such that a set of one or more MAC management messages to be transmitted are located immediately subsequent to a data burst containing the uplink (UL)-MAP; and
transmitting a signal based on the previously generated frame.

6. A method of wireless communications via orthogonal frequency-division multiplexing (OFDM) or orthogonal frequency division multiple access (OFDMA), comprising:
receiving a signal based on an OFDM or OFDMA frame having a downlink (DL)-MAP and two or more data bursts;
parsing the OFDM or OFDMA frame;
determining if there is one or more MAC management messages present in at least one of the two or more data bursts comprising:
processing the DL-MAP; and
evaluating a broadcasting messages bitmap included within the DL-MAP; and
entering a low power state before decoding the entire OFDM or OFDMA frame, if the one or more MAC management messages is not present.

7. The method of claim 6, further comprising:
locating the at least one of the two or more data bursts containing the one or more MAC management messages based on a bitmap pointer set, if the one or more MAC management messages is present; and
decoding the at least one of the two or more data bursts.

8. The method of claim 6, wherein determining if there is one or more MAC management messages present comprises:
processing at least the DL-MAP and a data burst immediately subsequent to a data burst containing a UL-MAP; and
evaluating whether or not the data burst immediately subsequent to the data burst containing the UL-MAP contains one or more MAC management messages.

9. An apparatus for wireless communications via orthogonal frequency-division multiplexing (OFDM) or orthogonal frequency division multiple access (OFDMA), comprising:
a processor configured to generate a frame having a downlink (DL)-MAP, comprising a broadcasting messages bitmap, and two or more data bursts and to configure at least one information element (IE) within the DL-MAP to indicate the presence of one or more MAC management messages in the two or more data bursts; and
a transmitter for transmitting a signal based on the frame.

10. The apparatus of claim 9, wherein the at least one IE within the DL-MAP is further configured to identify which of the two or more data bursts contains a MAC management message previously indicated.

11. The apparatus of claim 9, wherein the at least one IE within the DL-MAP is located in downlink interval usage code (DIUC) of the DL-MAP.

12. The apparatus of claim 11, wherein the at least one IE within the DL-MAP is located in DIUC 15.

13. An apparatus for wireless communications via orthogonal frequency-division multiplexing (OFDM) or orthogonal frequency division multiple access (OFDMA), comprising:
a processor configured to generate a frame having an uplink (UL)-MAP, comprising a broadcasting messages bitmap, and two or more data bursts and to configure a data burst layout of the frame such that a set of one or more MAC management messages to be transmitted are located immediately subsequent to a data burst containing the uplink (UL)-MAP; and
a transmitter for transmitting a signal based on the previously generated frame.

14. An apparatus for wireless communications via orthogonal frequency-division multiplexing (OFDM) or orthogonal frequency division multiple access (OFDMA), comprising:
a receiver for receiving a signal based on an OFDM or OFDMA frame having a downlink (DL)-MAP and two or more data bursts; and
a processor configured to parse the OFDM or OFDMA frame, to determine if there is one or more MAC management messages present in at least one of the two or more data bursts, to process the DL-MAP, to evaluate a broadcasting messages bitmap included within the DL-MAP, and to cause the apparatus to enter a low power state before decoding the entire OFDM or OFDMA frame, if the one or more MAC management messages is not present.

15. The apparatus of claim 14, wherein the processor is further configured to:
locate the at least one of the two or more data bursts containing the one or more MAC management messages based on a bitmap pointer set, if the one or more MAC management messages is present; and
decode the at least one of the two or more data bursts.

16. The apparatus of claim 14, wherein the processor is further configured to:
process at least the DL-MAP and a data burst immediately subsequent to a data burst containing a UL-MAP; and
evaluate whether or not the data burst immediately subsequent to the data burst containing the UL-MAP contains one or more MAC management messages.

17. An apparatus for wireless communications via orthogonal frequency-division multiplexing (OFDM) or orthogonal frequency division multiple access (OFDMA), comprising:
means for generating a frame having a downlink (DL)-MAP, comprising a broadcasting messages bitmap, and two or more data bursts;
means for configuring at least one information element (IE) within the DL-MAP to indicate the presence of one or more MAC management messages in the two or more data bursts; and
means for transmitting a signal based on the frame.

18. The apparatus of claim 17, wherein the at least one IE within the DL-MAP is further configured to identify which of the two or more data bursts contains a MAC management message previously indicated.

19. The apparatus of claim 17, wherein the at least one IE within the DL-MAP is located in downlink interval usage code (DIUC) of the DL-MAP.

20. The apparatus of claim 19, wherein the at least one IE within the DL-MAP is located in DIUC 15.

21. An apparatus for wireless communications via orthogonal frequency-division multiplexing (OFDM) or orthogonal frequency division multiple access (OFDMA), comprising:
means for generating a frame having an uplink (UL)-MAP, comprising a broadcasting messages bitmap, and two or more data bursts;
means for configuring a data burst layout of the frame such that a set of one or more MAC management messages to be transmitted are located immediately subsequent to a data burst containing the uplink (UL)-MAP; and means for transmitting a signal based on the previously generated frame.

22. An apparatus for wireless communications via orthogonal frequency-division multiplexing (OFDM) or orthogonal frequency division multiple access (OFDMA), comprising:
 means for receiving a signal based on an OFDM or OFDMA frame having a downlink (DL)-MAP and two or more data bursts;
 means for parsing the OFDM or OFDMA frame;
 means for determining if there is one or more MAC management messages present in at least one of the two or more data bursts comprising:
  means for processing the DL-MAP; and
  means for evaluating a broadcasting messages bitmap included within the DL-MAP; and
 means for entering a low power state before decoding the entire OFDM or OFDMA frame, if the one or more MAC management messages is not present.

23. The apparatus of claim 22, further comprising:
 means for locating the at least one of the two or more data bursts containing the one or more MAC management messages based on a bitmap pointer set, if the one or more MAC management messages is present; and
 means for decoding the at least one of the two or more data bursts.

24. The apparatus of claim 22, wherein the means for determining if there is one or more MAC management messages present comprises:
 means for processing at least the DL-MAP and a data burst immediately subsequent to a data burst containing a UL-MAP; and
 means for evaluating whether or not the data burst immediately subsequent to the data burst containing the UL-MAP contains one or more MAC management messages.

25. A computer-program product for wireless communications via orthogonal frequency-division multiplexing (OFDM) or orthogonal frequency division multiple access (OFDMA), comprising a non-transitory computer readable storage medium having instructions stored thereon, the instructions being executable by one or more processors and the instructions comprising:
 instructions for generating a frame having a downlink (DL)-MAP, comprising a broadcasting messages bitmap, and two or more data bursts;
 instructions for configuring at least one information element (IE) within the DL-MAP to indicate the presence of one or more MAC management messages in the two or more data bursts; and
 instructions for transmitting a signal based on the frame.

26. The computer-program product of claim 25, wherein the at least one IE within the DL-MAP is further configured to identify which of the two or more data bursts contains a MAC management message previously indicated.

27. The computer-program product of claim 25, wherein the at least one IE within the DL-MAP is located in downlink interval usage code (DIUC) of the DL-MAP.

28. The computer-program product of claim 27, wherein the at least one IE within the DL-MAP is located in DIUC 15.

29. A computer-program product for wireless communications via orthogonal frequency-division multiplexing (OFDM) or orthogonal frequency division multiple access (OFDMA), comprising a non-transitory computer readable storage medium having instructions stored thereon, the instructions being executable by one or more processors and the instructions comprising:
 instructions for generating a frame having an uplink (UL)-MAP, comprising a broadcasting messages bitmap, and two or more data bursts;
 instructions for configuring a data burst layout of the frame such that a set of one or more MAC management messages to be transmitted are located immediately subsequent to a data burst containing the uplink (UL)-MAP; and
 instructions for transmitting a signal based on the previously generated frame.

30. A computer-program product for wireless communications via orthogonal frequency-division multiplexing (OFDM) or orthogonal frequency division multiple access (OFDMA), comprising a non-transitory computer readable storage medium having instructions stored thereon, the instructions being executable by one or more processors and the instructions comprising:
 instructions for receiving a signal based on an OFDM or OFDMA frame having a downlink (DL)-MAP and two or more data bursts;
 instructions for parsing the OFDM or OFDMA frame;
 instructions for determining if there is one or more MAC management messages present in at least one of the two or more data bursts comprising:
  instructions for processing the DL-MAP; and
  instructions for evaluating a broadcasting messages bitmap included within the DL-MAP; and
 instructions for entering a low power state before decoding the entire OFDM or OFDMA frame, if the one or more MAC management messages is not present.

31. The computer-program product of claim 30, wherein the instructions further comprise:
 instructions for locating the at least one of the two or more data bursts containing the one or more MAC management messages based on a bitmap pointer set, if the one or more MAC management messages is present; and
 instructions for decoding the at least one of the two or more data bursts.

32. The computer-program product of claim 30, wherein the instructions for determining if there is one or more MAC management messages present comprise:
 instructions for processing at least the DL-MAP and a data burst immediately subsequent to a data burst containing a UL-MAP; and
 instructions for evaluating whether or not the data burst immediately subsequent to the data burst containing the UL-MAP contains one or more MAC management messages.

* * * * *